United States Patent
Benoit et al.

[11] 3,835,486
[45] Sept. 17, 1974

[54] TELESCOPING NOVEL STAND ASSEMBLY

[75] Inventors: Roland A. Benoit, Danielson; John Curran, Fitchville, both of Conn.

[73] Assignee: InterRoyal Corporation, New York, N.Y.

[22] Filed: Aug. 14, 1972

[21] Appl. No.: 280,425

[52] U.S. Cl. ............... 5/317 R, 5/92, 248/161, 248/412
[51] Int. Cl. .............. F16m 11/08, A61g 7/10
[58] Field of Search .............. 5/60, 82, 92, 317; 108/140, 146; 248/161, 404, 410, 412; 211/74

[56] References Cited
UNITED STATES PATENTS

| | | | |
|---|---|---|---|
| 1,031,637 | 7/1912 | Fischer | 248/161 |
| 2,516,925 | 8/1950 | Shaw | 5/82 |
| 2,957,187 | 10/1960 | Raia | 248/161 X |
| 3,285,207 | 11/1966 | Gunther et al. | 248/161 |
| 3,318,457 | 5/1967 | Krasnoff | 211/74 |

*Primary Examiner*—Casmir A. Nunberg
*Attorney, Agent, or Firm*—Arthur A. March, Esq.

[57] ABSTRACT

A support stand, particularly for hospital beds, includes outer and inner telescoping members arranged one within the other and which are telescopically movable for varying the heighth of the stand. The outer member carries a cross piece on its upper end having ends formed in a spiral to provide means for engaging articles thereon. The two members may be adjusted in height and locked into position by a releasable lock mechanism which includes a plurality of balls which are wedged into engagement between the two members for locking purposes and released for unlocking purposes.

6 Claims, 4 Drawing Figures

PATENTED SEP 17 1974　　　　　　　　　　3,835,486
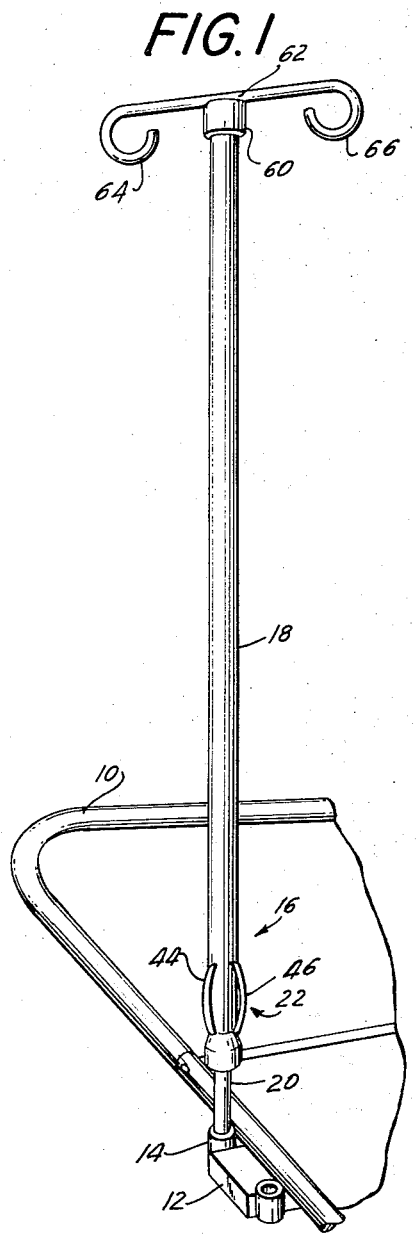
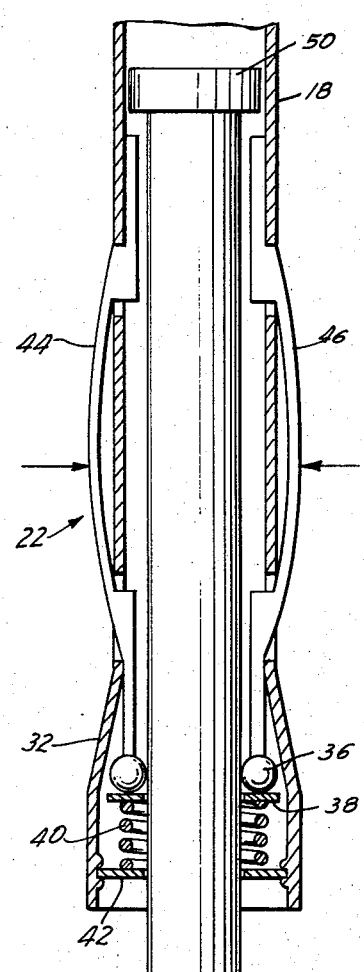
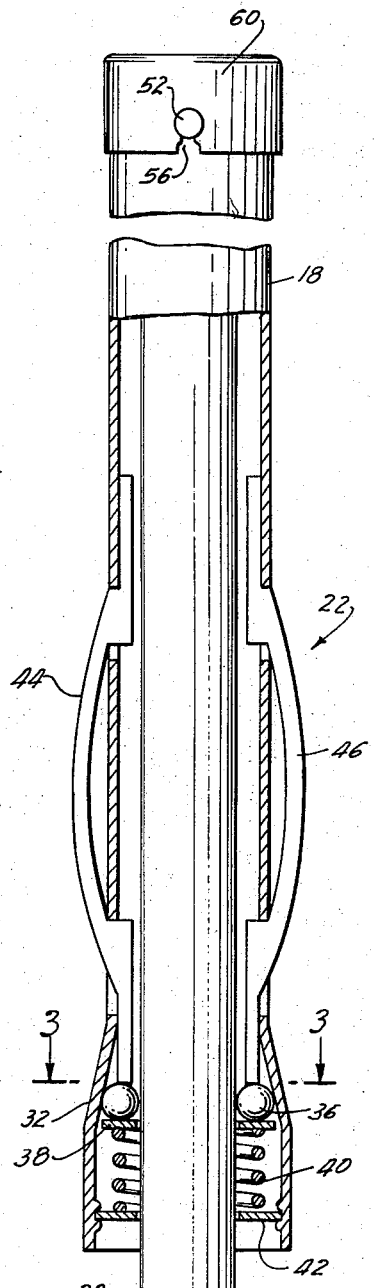
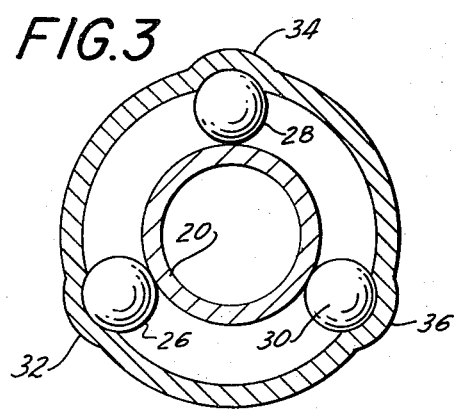
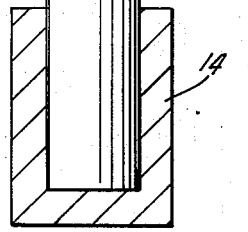
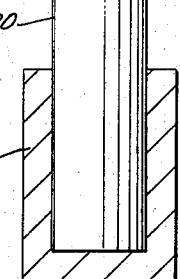
FIG.1　　FIG.3　　FIG.4　　FIG.2

TELESCOPING NOVEL STAND ASSEMBLY

BACKGROUND OF THE INVENTION

1. Field of the Invention

This invention relates in general to devices for use with beds and, in particular, to a new and useful adjustable telescoping stand assembly or holder for supporting articles on beds, particularly hospital beds.

2. Description of the Prior Art

Devices are known which can be fastened to a bed frame for the purpose of supporting such things as blood supplying devices, clothing, etc. A disadvantage of the known devices is that they are of complicated construction, require elaborate mounting elements and are expensive.

SUMMARY OF THE INVENTION

In accordance with the present invention, there is provided a telescoping stand assembly, which includes a base member adapted to be affixed to the bed frame, a lower telescoping member, and an easily releasable locking means for holding said members in fixed adjusted telescopic positions.

In addition, the upper telescoping member is provided with a transverse top article support member which is positioned by diametrically opposite studs at the top of the telescoping member. The studs fit into corresponding recesses or slots in the crossbar cap to fix the article support member at a selected angle. The locking means includes a plurality of ball members such as three ball bearings which are distributed around the circumference of the inner or lower telescoping member and are biased by a spring in an upward direction tending to wedge them between the upper and lower telescoping members and thus hold them in a desired telescoping relationship. The locking means also includes a mechanism which includes a plurality of resilient members, for example, one for each of the ball bearings, which when compressed by engagement by an operator's hand from the outside of the outer or upper telescoping member, displace the ball bearings downwardly out of a wedging position and allow for the easy adjustment of the height of the stand by the relative movement of the two telescopic members.

Accordingly, it is an object of the present invention to provide an improved type of bed stand or holder, which includes coacting upper and lower telescoping members with locking means for holding the members in an adjusted position.

A further object of the present invention is to provide a lock release mechanism for telescoping members of a holder or stand which is adapted to be engaged on a support element of a bed.

A still further object is to provide a stand or holder for beds and the like which is simple in design, rugged in construction, and economical to manufacture.

For a better understanding of the present invention, its operating advantages and specific objects attained by its use, reference should be had to the accompanying drawing and descriptive matter where the preferred embodiment is illustrated.

BRIEF DESCRIPTION OF THE DRAWING

In the Drawing:

FIG. 1 is a partial top side perspective view of a bed having a bed stand constructed in accordance with the invention;

FIG. 2 is an enlarged partial side elevational and partial transverse sectional view of the bed stand;

FIG. 3 is a section taken along the line 3—3 of FIG. 2; and

FIG. 4 is a view similar to FIG. 2 with the telescopic members positioned for maximum height.

GENERAL DESCRIPTION OF THE PREFERRED EMBODIMENT

Referring to the drawing in particular, the invention embodied therein, comprises a bed 10, having a frame 12 with an open top tubular bracket 14 which provides a support base for a bed stand or holder, generally designated 16.

In accordance with the invention, the holder 16 comprises an upper or outer telescoping piece or member 18, and a lower or inner telescoping piece or member 20. The upper telescoping member 18 carries a locking mechanism, generally designated 22, which includes a widened flange 24 forming a housing for three ball bearings 26, 28 and 30 which are uniformly arranged around the circumference of the lower member 20. The balls 26, 28 and 30 are supported in respective bulging vertical channels 32, 34 and 36 on the outer member 18 by a horizontal plate 38 which is biased upwardly by a spring 40. The opposite end of spring 40 is supported on a bottom plate 42. Release elements 44, 46 and 48 in the form of outwardly bulging springs are arranged around the outside of the upper member 18 and they have lower ends which extend into openings of the upper members and bear on the balls when the latter are wedged between the upper and lower telescopic members 18 and 20. When the release elements 44, 46 and 48 are compressed by the application of a peripheral pressure, their corresponding ends force the ball bearings 26, 28 and 30 out of their wedging position and thus allow for the relative movement of the members 18 and 20 and permit the easy adjustment of the height of the bed stand. The opposite or top ends of said release members 44, 46 and 48 form a stop in the path of a top flange 50 and prevents the separation of the two telescopic members 18 and 20. The release members engage the flange 50 on the top of the lower telescopic member 20, when the stand is at its maximum height.

Upper telescopic member 18 is also provided with projections or studs 52 and 54 which are located to engage with corresponding recesses or slots 56 and 58 (54 and 58 not shown in drawing) in a crossbar or collar cap 60 and fix the crossbar at a desired angular orientation. Attached to the croosbar cap 60 is a crossbar piece 62 which has curled ends 64 and 66 to provide for the convenient hanging of articles such as blood supplying devices and clothing.

While a specific embodiment of the invention has been shown and described in detail to illustrate the application of the inventive principles, it will be understood that the invention may be embodied otherwise without departing from such principles.

What is claimed is:

1. A support stand for a bed comprising outer and inner telescoping members arranged one within the other to form an extensible and retractable stand and being telescopically movable for varying the height of the stand, means at the top of the stand for supporting articles thereon, a housing on the outer telescoping member comprising a plurality of vertically extending bulging portions spaced around said inner member, a ball contained in each of said bulging portions, said bulging portions having outer walls extending inwardly toward said inner telescoping member, resilent means biasing said balls towards the inwardly extending walls of said bulging portions, and a release member carried on the outside of said outer telescopic member engageable with said balls for moving said balls against said resilient means to release said locking means.

2. A support stand for a bed, according to claim 1, wherein said release member comprises a spring having an engagement portion projecting outwardly from said outer member.

3. A support stand for a bed, according to claim 2, wherein said member includes a stop portion at the interior of said outer member engageable with said inner member to prevent separation of said inner and outer members.

4. A support stand for a bed, according to claim 1, including an annular plate contained in said housing member surrounding said inner member, said balls being carried on said annular plate, said spring biasing said plate in a direction upwardly to urge said balls into the narrowest portion of said ball bulging parts to wedge said housing, said balls and said inner member in a locked position.

5. A support stand for a bed, according to claim 1, including a cross member carried at the upper end of said stand.

6. A support stand for a bed, according to claim 5, wherein said cross member includes a cap engageable with the top of said stand and having recess means, said outer member having projection means engageable with said recess means of said cap for locking said cross member in respect to the top of said stand.

* * * * *